United States Patent
Tate et al.

(10) Patent No.: US 8,527,125 B2
(45) Date of Patent: Sep. 3, 2013

(54) SYSTEM AND METHOD FOR CONTROLLING TRACTION

(75) Inventors: William J. Tate, Dunlap, IL (US); Alexander C. Crosman, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 262 days.

(21) Appl. No.: 12/939,362

(22) Filed: Nov. 4, 2010

(65) Prior Publication Data
US 2012/0116618 A1 May 10, 2012

(51) Int. Cl.
*B60L 9/00* (2006.01)
(52) U.S. Cl.
USPC ............... 701/22; 701/70; 701/79; 303/139; 180/170
(58) Field of Classification Search
USPC .................. 701/22, 37, 70, 71, 79; 303/132, 303/139, 147; 180/170, 197
See application file for complete search history.

(56) References Cited

U.S. PATENT DOCUMENTS

| 3,713,504 A | 1/1973 | Shimer et al. |
|---|---|---|
| 5,378,053 A | 1/1995 | Patient et al. |
| 5,492,192 A | 2/1996 | Brooks et al. |
| 6,064,161 A | 5/2000 | Takahara et al. |
| 6,984,954 B2 * | 1/2006 | Leonardi et al. .............. 318/602 |
| 7,894,958 B2 | 2/2011 | Tate et al. |
| 2006/0106521 A1 | 5/2006 | Nasr et al. |
| 2008/0100132 A1 | 5/2008 | Jeon et al. |

FOREIGN PATENT DOCUMENTS

| JP | 06-351104 | * 12/1994 |
|---|---|---|
| JP | 06351104 | 12/1994 |
| JP | 2005075264 | 3/2005 |
| JP | 2005151633 | 6/2005 |
| JP | 2008-113541 | * 5/2008 |
| JP | 2008113541 | 5/2008 |

* cited by examiner

*Primary Examiner* — Gertrude Arthur Jeanglaude
(74) *Attorney, Agent, or Firm* — Leonard Stewart

(57) ABSTRACT

A traction control system for a machine having an electric drive configuration is disclosed. The traction control system includes an electric motor associated with at least one wheel and adapted to provide braking torque to the wheel. The control system further includes a controller configured to determine a rotational speed of the at least one wheel, compare the rotational speed to an allowable slide threshold, and adjust the braking torque to the at least one wheel during retarding if the speed is less than the allowable slide threshold.

16 Claims, 3 Drawing Sheets

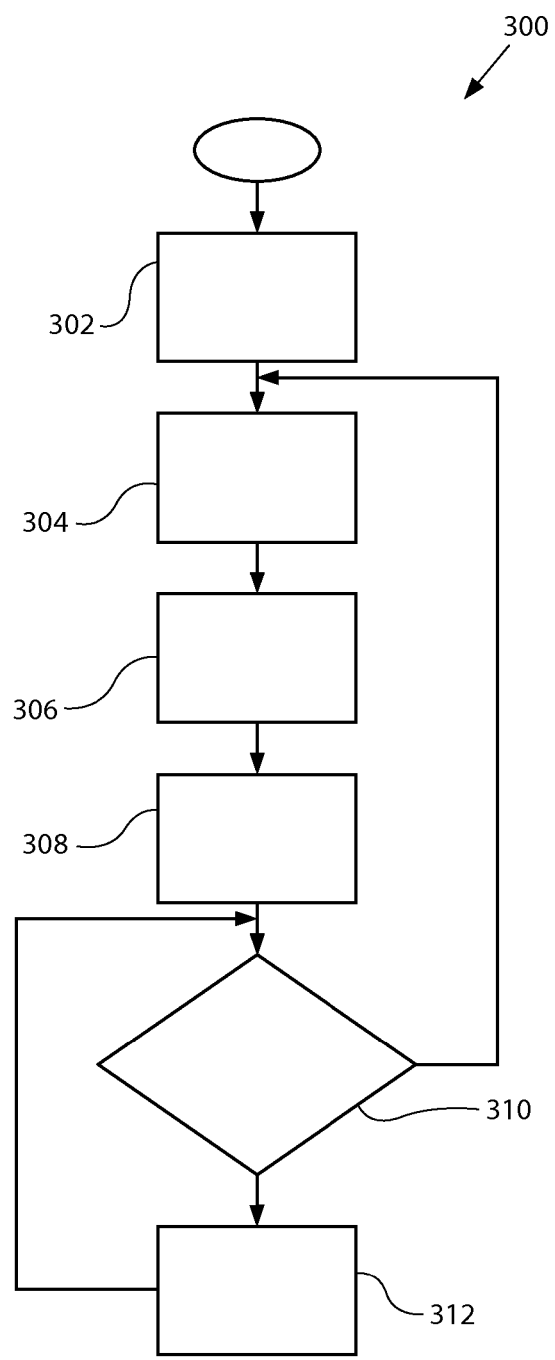

SYSTEM AND METHOD FOR CONTROLLING TRACTION

TECHNICAL FIELD

This patent disclosure generally relates to a traction control system and, more particular, to systems and methods for controlling traction during retarding for electric drive machines.

BACKGROUND

Vehicles having mechanical drive systems typically transmit torque to their drive wheels via gear arrangements, which are commonly known as differentials. A differential typically transfers rotational motion from an input shaft to each of two wheels disposed on both ends of a drive axle. Differentials are typically able to allow two wheels that are connected to a single axle to rotate at different speeds. Conditions requiring such differential motion may occur when the vehicle is turning or when the two wheels are experiencing different traction conditions. A loss of traction may result in a wheel sliding. Electric drive vehicles with rear-wheel drive are susceptible to such loss of traction that may be increased due to electric retarding applied to the rear wheels, which requires relatively higher ground friction than with all-wheel braking systems.

Even though differentials are effective in preventing wheel slipping or sliding for vehicles or machines, they are typically absent from vehicles having systems driving each wheel independently from the others, such as, vehicles having electrical or hydrostatic drive systems. Such vehicles typically lack a direct mechanical linkage between drive wheels because each drive wheel is independently powered by a motor that is associated with that wheel.

The disclosed systems and methods are directed to overcoming one or more of the problems set forth above.

SUMMARY

The disclosure describes, in one aspect, a traction control system for a machine having an electric drive configuration. The traction control system includes an electric motor associated with at least one wheel and adapted to provide braking torque to the wheel. The control system further includes a controller configured to determine a rotational speed of the at least one wheel, compare the rotational speed to an allowable slide threshold, and adjust the braking torque to the at least one wheel during retarding if the speed is less than the allowable slide threshold.

BRIEF DESCRIPTION OF THE DRAWINGS

FIG. 3 is a flow chart illustrating one embodiment of a method of controlling traction during retarding in accordance with an exemplary embodiment of the present disclosure.

DETAILED DESCRIPTION

Figure 1:
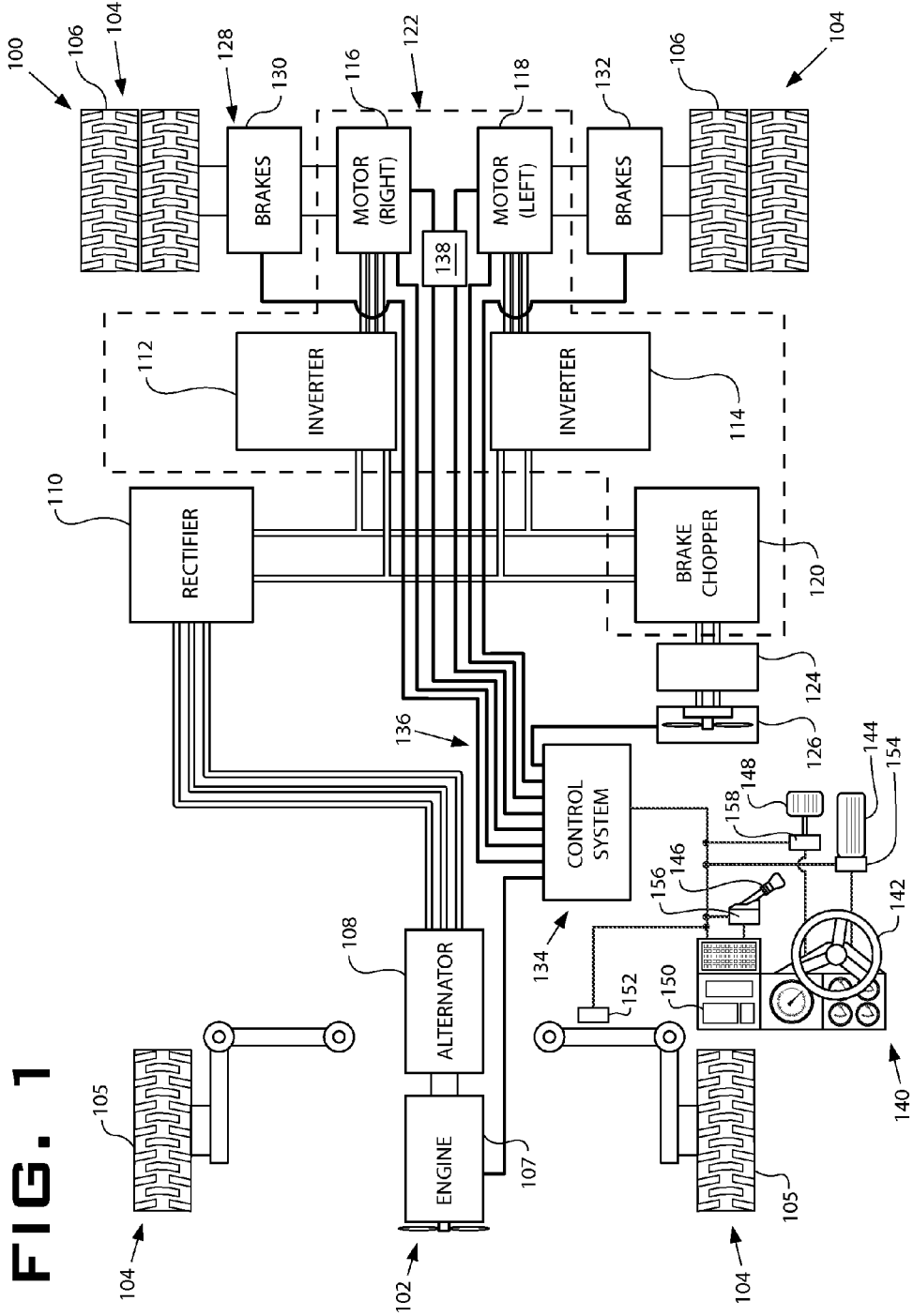
FIG. 1 schematically illustrates an electric drive machine having a control system in accordance with an exemplary embodiment of the present disclosure.

This disclosure relates to systems and methods for controlling traction of an electric drive machine. An exemplary embodiment of a machine 100 is shown schematically in FIG. 1. The machine 100 may be an off-highway truck, as shown, or any other vehicle that has an electric drive system, including passenger vehicles, trains, earthmoving machines, and mining vehicles. In an illustrated embodiment, the machine 100 includes an electric drive system 102 operatively coupled to travel mechanisms 104 to propel movement of the machine 100.

The travel mechanism 104 may include wheels and axles on each side of the machine 100. In the illustrated embodiment, the travel mechanisms 104 include a set of front wheels 105 on each side of the machine 100 and a set of rear dual wheels 106 on each side of the machine 100. The travel mechanisms 104 allow the machine 100 to travel on the surface of a type of terrain, such as earth surface terrain. The travel mechanisms 104 are shown as wheels, but it is contemplated that the travel mechanisms 104 may be any type of tractive or traction mechanism known, such as, for example, tracks and belts.

The electric drive system 102 includes an engine 107, alternator 108, rectifier 110, inverters 112, 114, and motors 116, 118. The engine 107 may provide power for the machine 100 and other machine components. Suitable engines may include gasoline powered and diesel powered engines. In some embodiments, the engine 107 may be a diesel engine that generates and transfers power to other components of the machine 100 through a power transfer mechanism, for example, a shaft (not shown). In the illustrated embodiment, the engine 107 provides power to the alternator 108. The alternator 108 generates a three-phase alternating current, which produces electrical power.

In some embodiments, the rectifier of the electric drive system 102 may convert the three-phase alternating current to a direct current. One or more of the inverters 112, 114 convert the direct current to alternating current to power one or more of the electric motors 116, 118. The electric motors 116, 118 represent motors that transfer the electric power received from the alternator 108 into power that drives one or more of the travel mechanisms 104. For example, in some embodiments, the motors 116, 118 may be wheel motors used to drive a wheel or wheels to propel the machine 100. In some embodiments, the rear dual wheels 106 may be independently or directly driven such that each of the motors 116, 118 may correspondingly drive each of the driven rear dual wheels 106. A speed of the motors 116, 118 may be controlled by controlling the frequency of the alternating current produced by the inverters 112, 114.

In some embodiments, a single motor drives all of the travel mechanisms 104, while in some embodiments, a plurality of motors drives the travel mechanisms 104. In the illustrated embodiment, for example, an electric motor 116, 118 is associated with each travel mechanism 104 embodied as the rear dual wheels 106, including a right motor 116 and a left motor 118. In some embodiments, the engine 107 may be used to power some of the plurality of motors, while a separate electric power source or power storage unit such as a battery (not shown) may be used to power the remaining of the plurality of motors. In some embodiments, the motors 116, 118 may be driven directly from the separate electric power source.

The engine 107, alternator 108, rectifier 110, inverters 112, 114, and motors 116, 118 may be operatively coupled to provide power sufficient to propel the machine 100 in a forward or a reverse driving direction during a driving phase or propel phase of operation. When operating the machine 100 in the driving phase, the motors 116, 118 provide a propel torque sufficient to propel the machine 100 in the forward or the reverse driving directions. In some embodiments, the electric drive system 102 may include a final drive (not shown), which includes a planetary gear set connected between the motors 116, 118 and the travel mechanisms 104, to convert the speed of the motors 116, 118 into an appropriate magnitude of the propel torque to propel the machine 100 in the forward or reverse driving directions.

Further, the electric drive system 102 may dissipate power sufficiently to retard or provide braking to the machine 100 during a retarding phase of operation. During the retarding phase of operation, the inverters 112, 114, motors 116, 118, and a braking chopper 120, collectively define an electric retarding system 122. When operating the machine 100 in the retarding phase, the motors 116, 118 may provide a braking torque sufficient to cause the machine 100 to slow down and/or come to a complete stop. In some embodiments, the motors 116, 118 during retarding may generate alternating current that is converted to direct current by the inverters 112, 114 and that flows through the brake chopper 120, which provides direct current to direct current conversion, and into a braking grid or resistor grid 124. In the illustrated embodiment, the power that is generated by the motors 116, 118 during retarding may be used to power a fan 126 or other appropriate cooling system to reduce a temperature resulting from the heat energy radiating from the braking grid 124.

In some embodiments, the machine 100 may also include a braking system 128 that includes the electric retarding system 122 and one or more service brakes 130, 132 for retarding or braking the movement of the machine 100. In some embodiments, the braking system 128 and the one or more service brakes 130, 132 may be associated with corresponding travel mechanisms 104. In some embodiments, the braking system 128 and the one or more service brakes 130, 132 may be associated with the front wheels 105 and/or the rear wheels 106. In the illustrated embodiment, the braking system 128 includes the electric retarding system 122 and the one or more service brakes 130, 132 embodied as a right service brake 130 and a left service brake 132. The service brakes 130, 132 may be hydraulic friction, hydro-mechanical, or mechanical brakes.

In some embodiments, all of the braking required to reduce a speed of the machine 100 may be provided by the electric retarding system 122. In some embodiments, all of the braking required to reduce the speed of the machine 100 may be provided by the service brakes 130, 132. In the illustrated embodiment, if the electric retarding system 122 is not capable of providing all of the braking required, a portion of the braking required to reduce the speed of the machine 100 is provided by the electric retarding system 122 and a portion of the braking required to reduce the speed of the machine 100 is provided by the service brakes 130, 132.

The service brakes 130, 132 may be manually actuated by an operator, which also allows the operator to manually control the speed of the machine 100. In some embodiments, the service brakes 130, 132 may be mechanically, electro-mechanically, hydraulically, pneumatically, or actuated by other known methods. In the illustrated embodiment, the service brakes 130, 132 may be automatically actuated by a control system 134. In some embodiments, the control system 134 may determine an appropriate ratio of retarding torque splits between, for example, the left and right set of dual wheels 106, or between the rear wheels 106 and the front wheels 105. In other words, the portion of braking provided by the electric retarding system 122 may be split between the left and right travel mechanisms 104 and/or between the rear dual wheels 106 and the front wheels 105.

In the illustrated embodiment, the control system 134 may be in communication with the electric drive system 102 through a data link interface 136. Additionally, or alternatively, the control system 134 may be in communication with the electric drive system 102 and other machine components wirelessly or remotely. In some embodiments, the control system 134 may send a command to the one or more components in response to signals collected and transmitted from one or more sensors. The control system 134 may receive sensor signals directly from the one or more sensors or indirectly such as, for example, from the data link interface 136. In the illustrated embodiment, the one or more sensors include one or more speed sensors 138 that may measure, collect, and transmit signals to the control system 134 indicative of the speed of the machine 100.

The speed sensors 138 may send speed signals to the control system 134 in response to requests, or the speed sensors 138 may be configured to send speed signals periodically, or in response to a machine event, such as an increase in speed, or a deceleration, and other such events. In some embodiments, the speed sensors 138 may measure a rotational speed of an axle used in the travel mechanisms 104 or other drive train components that are associated with a ground speed (or linear tire speed) of the machine 100. In some embodiments, the speed sensors 138 may be capable of measuring an actual ground speed or travel speed of the machine 100. In some embodiments, the speed sensors 138 may be configured or arranged to measure a rotational speed of idling wheels. For example, in the illustrated embodiment, the idling wheels are the front wheels 105. In some embodiments, the ground/travel speed may be determined by measuring the rotational speed of each idling wheel 105 and calculating the average of the measured speeds.

In some embodiments, the speed sensors 138 may be configured or arranged to measure a rotational speed of the powered or driven wheels. For example, in the illustrated embodiment, the powered or driven wheels are the rear dual wheels 106. The rotational speed may also be representative of a rotating machine RPM. In some embodiments, the speed sensors 138 may be capable of sensing the direction of rotating components associated with the motors 116, 118. For example, the speed sensors 138 may include one or more hall effect sensors (not shown). In some embodiments, the one or more hall effect sensors are associated with each of the right motor 116 and the left motor 118.

In the illustrated embodiment, the control system 134, which may be configured to perform certain control functions, is operatively connected to the electric drive system 102 through the data link interface 136. The data link interface 136 may represent one or more interface devices that interconnect one or more data links with the control system 134. It is contemplated that the data link interface 136 may include other standard data links and may be configured in a manner different from the illustrated embodiment without departing from the teachings of this disclosure.

The control system 134 is operatively connected to an operator interface 140 that may include a plurality of operator input devices such as, for example, a steering device 142, an accelerator pedal or throttle 144, a shift lever 146, a retarder lever 148, and a display 150 for communicating information and commands between the operator and the control system 134. The steering device 142 may be configured or adapted to control the direction of travel of the machine 100 by controlling, for example, a steering angle of the travel mechanisms 104. In some embodiments, the steering device 142 may be actuated by electrical, mechanical, or hydraulic power.

In the illustrated embodiment, the steering device 142 is hydraulically actuated and may include known hydraulic and/or electrical components that may cause one or more linkages to pivotally move to change a steering angle of the machine 100. The operator interface 140 may include a steering angle sensor 152 associated with the steering device 142 and adapted or configured to measure the steering angle of the travel mechanisms 104, and thus, the steering angle of the machine 100.

In some embodiments, the operator interface 140 may include an accelerator pedal position sensor 154 that is associated with the accelerator pedal 144, which is used to determine a requested engine speed that corresponds to a desired motor power. In some embodiments, the desired motor power may correspond with a depression of the accelerator pedal 144. The accelerator pedal 144 may be configured to control an acceleration and/or deceleration of the machine 100. The accelerator pedal position signal may be transmitted from the accelerator pedal position sensor 154 to the other components of the control system 134 to indicate an amount of torque requested by the operator.

The control system 134 may control the electric drive system 102 to produce a desired propulsion of the machine 100 in the forward or the reverse driving directions. The control system 134 may manage torque commands for the motors 116, 118 by taking into account a number of factors, such as operator requests, current machine speed, engine power availability, machine speed limits, and environment factors, including drivetrain and component temperatures. In some embodiments, the control system 134 may determine a desired torque to transmit to the motors 116, 118 based on one or more of the accelerator pedal position signal, a requested gear command signal from the shift lever 146, a retarder lever position signal, a payload status, and/or speed limits.

For example, the operator interface 140 may include a shift lever position sensor 156 associated with the shift lever 146 to detect an operator's intention to change from one position of the shift lever 146 to another position of the shift lever 146. The requested gear command signal may represent such gear selections as park, reverse, neutral, drive, or low. The operator may engage the shift lever 146 to control the driving direction of the machine 100. For example, the shift lever 146 may include at least a drive and a reverse position associated respectively with the forward and reverse driving directions of the machine 100.

The control system 134 may operatively interact with the operator interface 140 and other components to determine the ground speed of the machine 100. For example, the control system 134 may determine the ground speed of a centerline of the machine 100 based at least in part on the rotational speed of at least one of the idling wheels 105 and the steering angle of the machine 100. Nevertheless, it is contemplated that any suitable method may be used to determine the travel or ground speed of the machine 100.

In the illustrated embodiment, the control system 134 includes one or more data structure, such as, for example, one or more maps, which may include two dimensional arrays or lookup tables, in memory. The maps may contain data in the form of equations, tables, or graphs. The control system 134 may contain a map that correlates a steering angle value to a slip or slide ratio. The control system 134 may be configured or adapted to calculate a specific slip/slide ratio that corresponds to a specific steering angle, and may further perform this calculation continuously as the steering angle changes during operation.

The slip and slide ratios are non-dimensional values indicative of relative speeds between two wheels that are connected to the same axle or that are connected to the machine 100 at opposing sides. For example, the slip ratio may be a ratio of rotational speeds between right and left rear wheels 106 (i.e., rotational speed of the right rear wheel 106 divided by the rotational speed of left rear wheel 106), which should be about equal to 1 when no slip/slide is present and the machine 100 is travelling in a straight line.

The control system 134 may use the slip/slide ratio map in an algorithm that is adapted to adjust the torque commanded to each individual driven wheel 106, 106. A flowchart for a method of controlling traction by adjusting the torque commanded to each individual driven wheel 106, 106 is generally shown at 200 in FIG. 2. The control system 134 is arranged for simultaneous control of two driven wheels, each of which is driven by a respective motor 116, 118. The wheels are designated as "right" or "left" to indicate that they are arranged on either side of the machine 100 along a single axle. One can appreciate that the methods disclosed herein are equally applicable for machines having more or fewer than two driven wheels.

Figure 2:
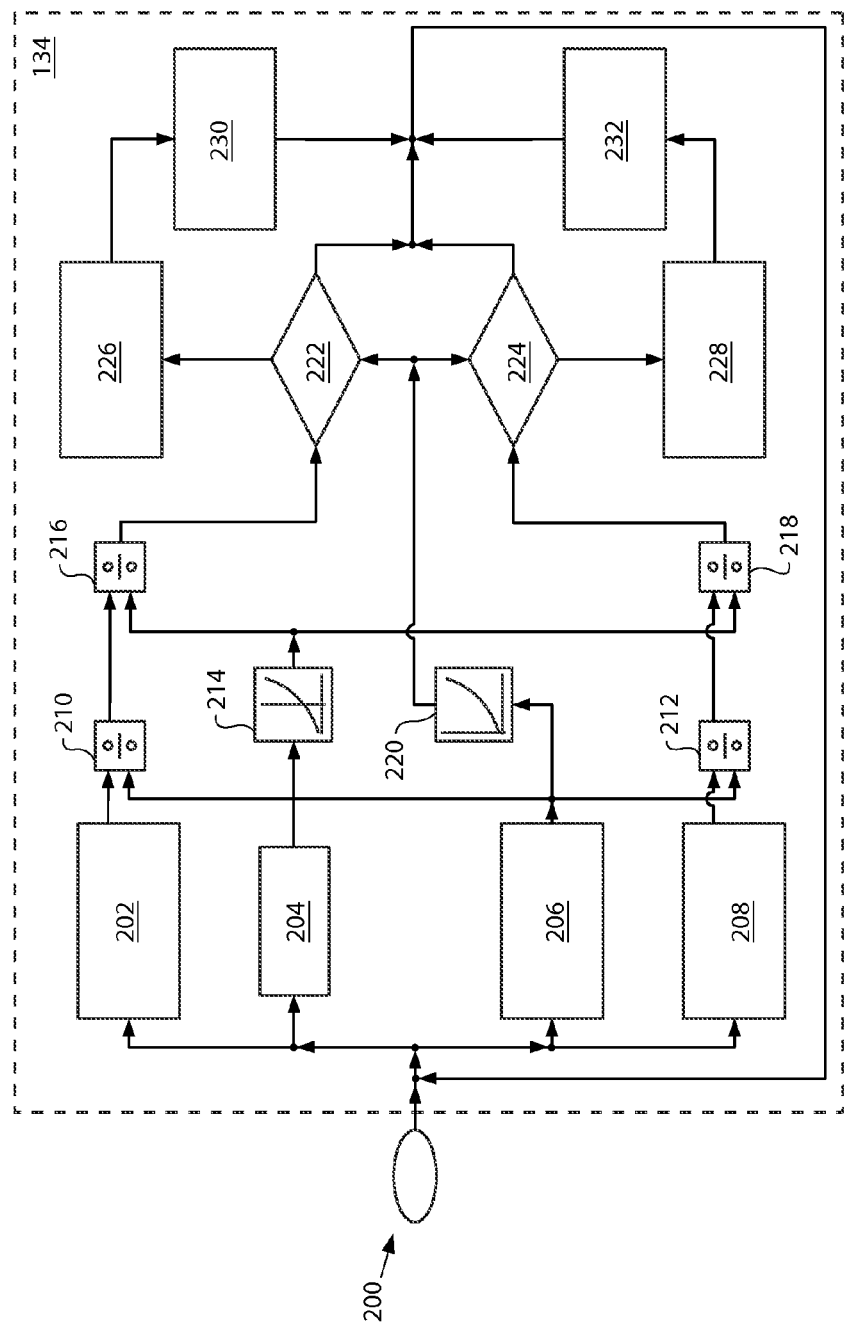
FIG. 2 is a flow chart illustrating one embodiment of a method of controlling traction in accordance with an exemplary embodiment of the present disclosure.

As shown in FIG. 2, the control system 134 receives inputs from various systems of the machine 100, for example, an input from the steering angle sensor 152. The control system 134 may also receive inputs from at least one of the speed sensors 138. Based on these inputs, the control system 134 is adapted to calculate and apply torques to the motors 116 and 118 to control traction of the machine 100. The control system 134 may use signals from the speed sensors 138 that are associated with each of the driven wheels 106, 106 to determine the rotational speeds of each driven wheel 106 individually. A wheel speed of the left driven wheel 106 is determined at 202 based on input from the at least one speed sensor 138.

The control system 134 may use a signal from the steering sensor 152 to account for machine turns in controlling the traction of the machine 100. In the illustrated embodiment, the control system 134 is adapted or configured to determine a steering angle of the machine at 204 based on a signal from the steering angle sensor 152. The control system 134 may use signals from the speed sensors 138 that are associated with the non-driven wheels 105, 105 to determine the ground speed of the machine 100. The travel speed or ground speed of the machine is measured at 206, and the wheel speed of the right driven wheel is determined at 208 based on input from the at least one speed sensor 138.

The control system 134 may determine a normalized or corrected speed or speed ratio for each one of the driven wheels 106, 106. For example, a speed ratio for the left driven wheel, $V_{L,TS}$, may be calculated at 210 by dividing the wheel speed for the left driven wheel 106, which was calculated at 202, by the ground speed of the machine 100, which was calculated at 206. In addition, the control system 134 may calculate a speed ratio $V_{R,TS}$ for the right driven wheel 106 at 212 by dividing the wheel speed for the right driven wheel 106, which was calculated at 208, by the ground speed of the machine, which was calculated at 206.

These normalizations or corrections of the drive wheels' speeds should be equal to 1 when the machine speed or ground speed matches the speed of each wheel 106, that is, when there is no slipping or sliding, and should change to a value above or below 1 when there is slipping or sliding. As can be appreciated, each speed ratio $V_{R,TS}$ and $V_{L,TS}$ will increase above 1 when the ground speed of the corresponding wheel 106, 106 is greater than the speed of the machine 100, such as, for example, when that wheel 106, 106 is slipping for lack of grip with the ground, and will be less than 1 when the machine is travelling faster than the speed of the corresponding wheel 106, 106, such as, for example, when the wheel 106, 106 is becoming stuck or when the wheel 106, 106 is sliding during retarding.

The control system 134 also receives information indicative of the angle of the steering device 142 via a signal from the steering angle sensor 152. The steering angle information is input to a table at 214 to determine the expected slip or slide ratio, $SR_E$, or the expected slip or slide that results when the machine 100 is turning and the wheels 106, 106 arranged along a single "axle" line are following circular paths that are at different distances from a center point of the turning radius of the machine 100. In other words, the expected slip ratio $SR_E$ accounts for differences in rotational speed for the wheels 106, 106 that are not mechanically linked to each other.

When the machine is turning, the steering angle determined at 204 is used to calculate an expected slip or slide ratio $SR_E$ at 214. The calculation of the expected slip or slide ratio $SR_E$ at 214 may include a lookup table of slip/slide ratio versus steering angle or may be any other type of calculation, such as, for example, a function having the steering angle and slip/slide ratio values as variables. Nevertheless, the expected slip or slide ratio $SR_E$ as well as the speed ratios $V_{L,TS}$ and $V_{R,TS}$ are non-dimensional or normalized parameters. Specifically, the expected slip or slide ratio $SR_E$ represents the expected slip or slide or difference in wheel speed that will occur when the machine 100 is turning.

The expected slip or slide ratio $SR_E$ is considered as the ratio between the speed of a wheel following an inner path of the turn and the speed of the corresponding wheel following an outer path of the turn. For example, when the machine is turning left, the left driven wheel 106 will follow an inner path that may be curved or circular about a turn center (not shown), while the right driven right wheel 106 will follow an outer path that is disposed at a greater radial distance from the turn center relative to the radial distance of the left driven wheel 106.

The control system 134 uses the expected slip or slide ratio $SR_E$ to perform a second normalization or correction of the speed ratios $V_{R,TS}$ and $V_{L,TS}$ to account for steering. For example, when the machine 100 is turning, one or both speed ratios $V_{R,TS}$ and $V_{L,TS}$ may change from the base value of 1, even though there may be no slippage due to loss of traction. This change may be the result of the different trajectories followed by the driven wheels 106, 106 during the turn. In this situation, the expected slip or slide ratio $SR_E$ can be used to account for the differences in wheel speed that are attributed to the turn, such that the respective speed ratio $V_{R,TS}$ and $V_{L,TS}$ for each driven wheel can be adjusted to the base value of 1 during the turn.

For example, the speed ratio of the wheel travelling on the inside track during a sharp turn may assume a speed ratio of one-half (½), indicating that the wheel is travelling at half the speed of the machine 100. The expected slip or slide ratio $SR_E$ that corresponds to the specific turn angle may also be set to one-half (½), such that the ratio between the speed ratio and the expected speed ratio is equal to 1. Hence, the result of each of these normalizations is a corrected speed ratio, which is calculated for each driven wheel 106.

In the illustrated embodiment, a left wheel corrected speed ratio $V_{L,TS,SR}$ is calculated at 216 by dividing the speed ratio $V_{L,TS}$ (210) for the left wheel 106 by the expected slip or slide ratio $SR_E$ (214). Similarly, a right wheel corrected speed ratio $V_{R,TS,SR}$ is calculated at 218 by dividing the speed ratio $V_{R,TS}$ (212) for the right wheel 106 by the expected slip or slide ratio $SR_E$ (214). Both the left wheel corrected speed ratio $V_{L,TS,SR}$ and the right wheel corrected speed ratio $V_{R,TS,SR}$ represent non-dimensional values that are indicative of slipping or sliding of the machine's driven wheels 106, 106 during either straight line or turning motion of the machine 100.

The corrected slip ratios $V_{R,TS,SR}$ and $V_{L,TS,SR}$ are not values of actual slip or slide. Instead, the corrected slip ratios $V_{R,TS,SR}$ and $V_{L,TS,SR}$ are non-dimensional slip or slide parameters or ratios that qualify and quantify a slip or slide condition for the driven wheels 106, 106 disposed along the same drive axle of the machine 100. The corrected speed ratios $V_{R,TS,SR}$ and $V_{L,TS,SR}$ are inclusive or account for any straight-line motion slip or slide, which may be due to uneven traction, as well as speed differentials in the driven wheels 106, 106 that can result from turning.

Having determined the corrected speed ratios $V_{R,TS,SR}$ and $V_{L,TS,SR}$, the control system 134 compares each to a speed ratio threshold value, $T_{SR}$. The speed ratio threshold value $T_{SR}$ may be considered as a threshold slip or slide condition that the machine 100 may tolerate during operation in propulsion or retarding modes of operation. Each corrected speed ratio $V_{L,TS,SR}$ and $V_{R,TS,SR}$ is compared to the threshold value $T_{SR}$ individually such that the slip or slide of each driven wheel 106, 106 can be determined separately. The threshold value $T_{SR}$ can be a constant, non-dimensional parameter, for example, 10 percent (%), which represents the extent of slipping or sliding that can be present in the operation of the machine 100 without requiring intervention by the control system 134 to the torques commanded to each of the driven wheels 106, 106. The threshold $T_{SR}$ may alternatively be a variable that depends on an operating parameter of the machine, for example, the ground speed of the machine 100.

In the illustrated embodiment, the threshold $T_{SR}$ is determined at 220 based on the ground speed of the machine 100 (206) using, for example, a lookup table. The threshold $T_{SR}$ is compared to each corrected speed ratio $V_{L,TS,SR}$ and $V_{R,TS,SR}$ at, respectively, 222 and 224. Based on the comparisons at 222 and 224, the control system 134 makes two independent determinations of whether one or both corrected speed ratios $V_{L,TS,SR}$ and $V_{R,TS,SR}$ exceed the threshold $T_{SR}$. When the control system 134 determines that at least one corrected speed ratio $V_{L,TS,SR}$ and/or $V_{R,TS,SR}$ has exceeded the threshold $T_{SR}$, the control system 134 intervenes to adjust the torque being commanded to the wheel that is slipping or sliding, by adjusting the torque being commanded at 226 and/or 228 to the corresponding motor 116 and/or 118.

The control system 134 may operate at a preset frequency or cycle time, for example, at 125 Hz. At each cycle, the control system 134 may compare each of the corrected speed ratios $V_{R,TS,SR}$ and $V_{L,TS,SR}$ with the threshold value $T_{SR}$ to determine whether a slip or slide condition is present and whether the slip or slide condition exceeds the allowable slip or slide threshold for the ground speed of the machine 100. When one or both of the corrected speed ratios $V_{R,TS,SR}$ and $V_{L,TS,SR}$ are determined to be higher than the calculated threshold value $T_{SR}$, the control system 134 may adjust the torque commanded to the corresponding wheel, for example, by decreasing the torque being commanded to that wheel 106.

This adjustment to the speed of rotation of a corresponding wheel 106, 106 purports to bring each corresponding corrected speed ratio to a value that is within the threshold value $T_{SR}$. In this embodiment, the control system 134 may assume a more active role in reducing slip or slide of the driven wheels 106, 106 during operation. The control system 134 continuously calculates a slip or slide ratio error or, alternatively, a difference between each corrected slip or slide ratio, $V_{R,TS,SR}$ and $V_{L,TS,SR}$ and the threshold value $T_{SR}$. Stated differently, the continuously calculated corrected slip or slide ratios $V_{R,TS,SR}$ and $V_{L,TS,SR}$ may be considered as "actual" slip or slide ratios that are reflective of a slip or slide condition for each of the driven wheels 106, 106.

These actual slip or slide ratios $V_{R,TS,SR}$ and $V_{L,TS,SR}$ should always be within an acceptable range, which depends on the threshold value $T_{SR}$. Here, the control system 134 calculates a difference between each corrected speed ratio $V_{L,TS,SR}$ and $V_{R,TS,SR}$ and the threshold $T_{SR}$ to generate an error. The error may be used to drive a PI controller (not shown) but that is included within, respectively, 226 and 228. The control system 134 may further include various other sub-routines or power circuits that command a torque to each motor at 230 and 232.

In some embodiments, the control system 134 may include one or more controllers. In some embodiments, the one or more controllers may include one or more control modules (e.g. ECMs, ECUs, etc.). The one or more control modules may include processing units, memory, sensor interfaces, and/or control signal interfaces (for receiving and transmitting signals). The processing unit may represent one or more logic and/or processing components used by the control system 134 to perform certain communications, control, and/or diagnostic functions. For example, the processing unit may be configured to execute routing information among devices within and/or external to the control system 134.

Further, the processing unit may be configured to execute instructions from a storage device, such as memory. The one or more control modules may include a plurality of processing units, such as one or more general purpose processing units and or special purpose units (for example, ASICS, FPGAs, etc.). In some embodiments, functionality of the processing unit may be embodied within an integrated microprocessor or microcontroller, including integrated CPU, memory, and one or more peripherals or in multiple microprocessors or microcontrollers. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

Industrial Applicability

The industrial applicability of the systems and methods for controlling traction in an electric drive machine described herein will be readily appreciated from the foregoing discussion. In accordance with certain embodiments, the disclosed control system may be applicable to any machine that has wheels driven independently from each other, for example, a machine having an electric or hydrostatic drive system that uses a motor connected to each wheel. Each of the motors may be operated independently and without mechanical connections with other motors. The disclosed control system may be helpful in situations where one or both of the driven wheels of the machine are slipping or sliding due to, for example, poor traction when the machine is travelling in a straight line, in a forward or reverse driving direction, when the machine is turning, when the machine is operating in a retarding mode, such as, for example, when braking, or any other conditions that cause differential speeds to occur in the driven wheels.

FIG. 3 illustrates an exemplary embodiment of the control system 134 and the process (300) of adjusting an electric motor adapted to provide braking torque to at least one wheel until a speed ratio based in part on the speed of the at least one wheel is equal to an allowable slide threshold during retarding. The control system 134 may determine that machine is in a retarding mode of operation (Step 302), such as, for example, when an operator engages the retarder lever 148. The control system 134 is adapted to determine a ground speed (Step 304). In some embodiments, the ground speed is an estimate of the travel speed of the machine 100 made based on speed measurements of traction motors, or on one or more independent ground speed measurements. In the illustrated embodiment, at least one of the speed sensors 138 is associated with the non-driven wheels 105, and the ground speed measurements are based on the measured speeds of the non-driven wheels 105 combined with the driven wheels 106, as discussed in detail above. For convenience, all speeds are expressed in relation to traction motor RPM, although it is contemplated that the speeds can be expressed in wheel RPM or machine speed in km/hr.

The control system 134 further determines an amount of slide that will be allowable (Step 306) before an attempt to correct or adjust is initiated. In the illustrated embodiment, the allowable wheel slide threshold is established for use during retarding and is set approximately below the ground speed of the machine 100. For example, in some embodiments, the allowable slide threshold may be established as a percentage of ground speed. If, for example, a ten percent (10%) slide may be allowed, and the measure ground speed corresponds to 1000 RPM on the traction motors, than any motor speed down to 900 RPM would be allowed without correction. Thus, any motor speed less than 900 RPM will be below the threshold.

The control system 134 determines the motor speed of at least one of the driven wheels 106 (Step 308). In some embodiments, the control system 134 may determine the rotational speeds of each of the driven wheels 106, 106 to compare to the slide threshold. The actual motor speed (from Step 308) is compared (Step 310) to the allowable slide threshold (from Step 306). If the motor speed is less than the slide threshold (Step 310; Yes), the control system 134 is adapted to adjust the torque provided to the motor associated with the wheel until the motor speed is within to the slide threshold.

In the illustrated embodiment, control system 134 controls each motor independently so that each wheel speed is separately controlled and each wheel speed is essentially maintained substantially equal to the other. In some embodiments, if the motor speed is less than the slide threshold, the control system 134 is adapted to hold mechanical brake torque constant while modulating the electric motor torque until the wheel speed is within the slide threshold.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A traction control system for a machine having an electric drive configuration, comprising:
an electric motor associated with at least one wheel and adapted to provide braking torque to the wheel; and
a controller configured to:
determine a rotational speed of the at least one wheel;
compare the rotational speed to an allowable slide threshold, wherein the allowable slide threshold is based on a ground speed of the machine, wherein the allowable slide threshold is a percentage of the ground speed of the machine; and
adjust the braking torque to the at least one wheel during retarding if the rotational speed is less than the allowable slide threshold.

2. The traction control system claim 1, wherein the allowable slide threshold is ninety percent of the measured ground speed of the machine.

3. The traction control system of claim 1, further including at least one mechanical brake associated with the at least one wheel, wherein the mechanical brake is adapted to provide braking torque to the wheel.

4. The traction control system of claim 3, wherein the controller is further configured to:
adjust the electric motor to apply a first portion of the braking torque to the at least one wheel during retarding; and
adjust the mechanical brake to provide a second portion of the braking torque to the at least one wheel during retarding until the speed is greater than the allowable slide threshold.

5. The traction control system of claim 4, wherein the second portion of the braking torque is held constant while the first portion of the braking torque is modulated until the speed is greater than the allowable slide threshold.

6. A method for controlling traction of a machine having an electric drive configuration, comprising:
determining a retarding mode of operation for the machine;
determining a rotational speed of at least one wheel of the machine during the retarding mode;
determining a ground speed of the machine during the retarding mode;
comparing the rotational speed to an allowable slide threshold,
wherein the allowable threshold is based on the ground speed,
wherein the allowable slide threshold is a percentage of the ground speed; and
adjusting a braking torque provided by an electric motor to the at least one wheel if the rotational speed is less than the allowable slide threshold.

7. The method claim 6, wherein comparing the rotational speed to an allowable slide threshold includes the allowable slide threshold based on ninety percent of the ground speed.

8. The method of claim 6, further comprising:
adjusting the braking torque includes adjusting braking torque provided by a mechanical brake.

9. The method of claim 8, wherein adjusting the braking torque includes adjusting a first portion of the braking torque provided by the electric motor and adjusting a second portion of the braking torque provided by the mechanical brake until the speed is greater than the allowable threshold.

10. The method of claim 9, wherein adjusting the second portion includes holding the braking torque provided by the mechanical brake constant and adjusting the second portion includes modulating the braking torque provided by the electric motor until the speed is greater than the allowable threshold.

11. An electric drive machine, comprising:
a first wheel;
a first motor operating to rotate the first wheel about a first axis relative to the machine;
a first sensor disposed to measure a speed of the first wheel relative to the machine;
a speed sensor disposed to measure the speed of the machine relative to the ground;
a controller operatively connected to the first motor, the first sensor, and the speed sensor; the controller configured to:
determine a rotational speed of the first wheel based on information from the first sensor;
determine a ground speed of the machine based on information from the speed sensor;
determine a slide threshold value based on the ground speed, wherein the slide threshold value is a percentage of the ground speed;
compare the rotational speed with the threshold value; and
when the rotational speed is less than the threshold value, adjust a torque command to the first motor such that the rotational speed exceeds the threshold value.

12. The machine of claim 11, further comprising:
a second wheel;
a second motor operating to rotate the second wheel about a second axis relative to the machine, wherein the second axis is parallel to the first axis;
a second sensor disposed to measure a speed of the second wheel relative to the machine; wherein the controller is further configured to:
determine a rotational speed of the second wheel based on information from the second sensor;
determine a slide threshold value based on information from the speed sensor, wherein the slide threshold value is based on the ground speed, wherein the slide threshold value is a percentage of the ground speed;
compare the rotational speed with the threshold value; and
when the rotational speed is less than the threshold value, adjust a torque command to the second motor such that the second rotational speed exceeds the threshold value.

13. The machine of claim 12, further comprising:
a first mechanical brake operatively coupled to the first wheel, the first mechanical brake configured to providing braking torque to the wheel.

14. The machine of claim 13, further comprising:
a second mechanical brake operatively coupled to the second wheel, the second mechanical brake configured to providing braking torque to the wheel.

15. The machine of claim 13, wherein the controller is further configured to:
provide constant braking torque from the first mechanical brake; and
adjust the torque command to the first motor to modulate the braking torque until the first rotational speed exceeds the threshold value.

16. The machine of claim 15, wherein the controller is further configured to:
provide constant braking torque from the second mechanical brake; and adjust the torque command to the second motor to modulate the braking torque until the second rotational speed exceeds the threshold value.

\* \* \* \* \*